United States Patent [19]

Andersen

[11] 4,233,647
[45] Nov. 11, 1980

[54] PHOTOGRAPHIC ACCESSORY APPARATUS

[76] Inventor: Axel B. Andersen, 1923 Morena Blvd., San Diego, Calif. 92110

[21] Appl. No.: 936,752

[22] Filed: Aug. 25, 1978

[51] Int. Cl.³ .............................................. G03B 15/02
[52] U.S. Cl. .......................................... 362/16; 362/3; 362/18; 354/126; 354/293; 354/81; 354/290
[58] Field of Search ...................... 362/18, 16, 3, 8, 11, 362/404, 406; 354/126, 293, 81, 290, 291, 292

[56] References Cited

U.S. PATENT DOCUMENTS

| | | | |
|---|---|---|---|
| 3,374,342 | 3/1968 | Hutchins | 362/8 |
| 3,516,343 | 6/1970 | Tunney | 354/290 |
| 3,860,812 | 1/1975 | Schneider | 362/355 |
| 3,952,322 | 4/1976 | Wolfe | 354/290 |
| 4,045,808 | 8/1977 | King | 362/16 |

FOREIGN PATENT DOCUMENTS 111226  7/1967  Norway ........................................ 362/8

Primary Examiner—Benjamin R. Padgett
Assistant Examiner—J. Lloyd Barr
Attorney, Agent, or Firm—Ralph S. Branscomb

[57] ABSTRACT

A versatile camera and lighting apparatus is provided wherein a pair of high intensity lights such as flash or strobe units are directed somewhat away from the area to be photographed and onto a diffusion/reflector screen which reflects diffused light onto the subject or area to be photographed, thereby eliminating sharp shadows and providing a more accurate picture. Multiple adjustment features are provided in the vertical ceiling mount as well as the lateral light source and screen support arms, and in the camera support bracket itself.

6 Claims, 5 Drawing Figures

PHOTOGRAPHIC ACCESSORY APPARATUS

BACKGROUND OF THE INVENTION

The flash attachments and strobe units used to artificially light subjects and areas to be photographed are ordinarily by their nature quite high intensity and radiate from a small, point source. Such lights when used to illuminate an object will cast sharp shadows, which often are deceptive and appear as structure in the finished photograph. If the point source is exactly, or nearly exactly, axially aligned with the camera lens so that shadows would not be visible in the photographs, nevertheless, those areas of the subject which are substantially parallel to the line of sight between camera and subject will receive little light and will appear unduly dark in the photograph.

There is a need therefore, for an adjustable but self-contained camera unit having a pair of wide-spaced diffuse light sources timed with the operation of the camera to provide virtually shadowless, accurate photography.

SUMMARY OF THE INVENTION

The present invention fulfills the above-mentioned need by providing a camera preferably mounted on an adjustable vertical support having its top end mounted in the ceiling in the room where the photographs are to be taken.

A pair of laterally extended, doubly pivoted arms adjustable at both pivot points in the horizontal plane each has a strobescopic or other high intensity, directional light source directed at an angle somewhat away from the subject to be photographed. Adjacent the directional light source is a diffusion screen which has the effect of re-radiating diffused light from the high intensity source onto the photographic subject from both sides of the camera, which is centrally mounted. The camera and the light sources and screens can together be established at different vertical heights.

DETAILED DESCRIPTION OF THE PREFERRED EMBODIMENT

Figure 1:
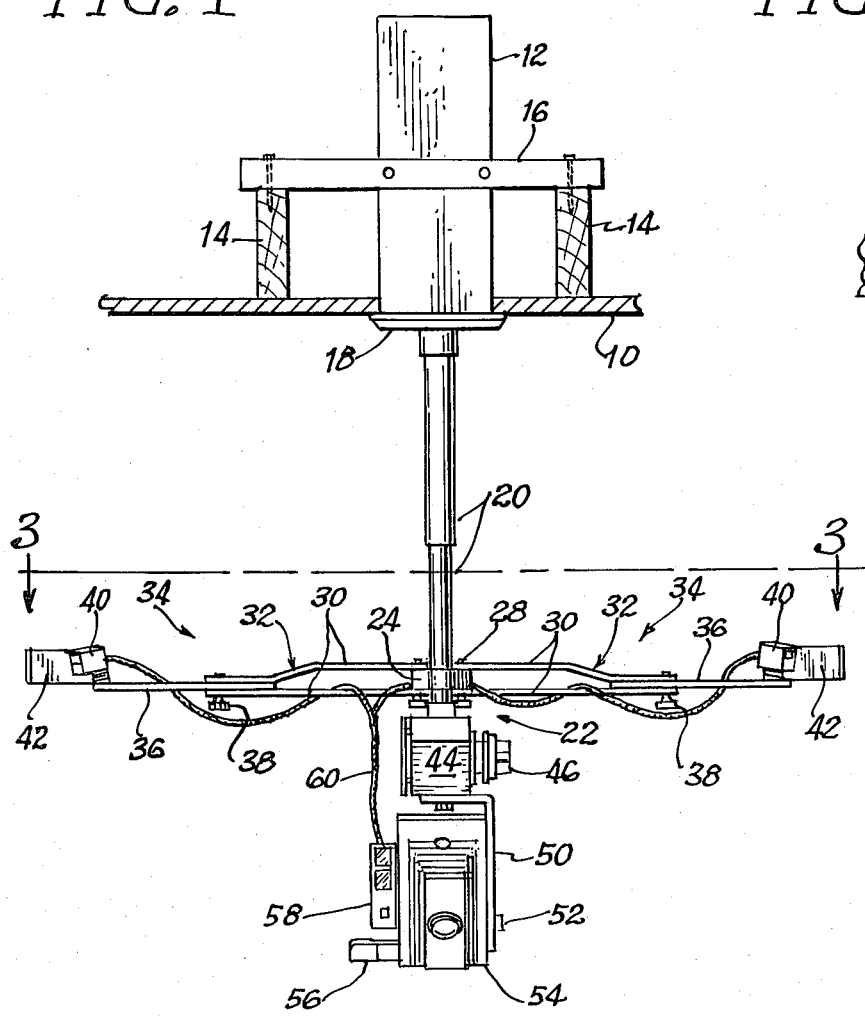
FIG. 1 is a front elevation view of the apparatus shown mounted in a ceiling with portions thereof cut away.

The unit is shown installed in FIG. 1. This apparatus was developed for use with a human posture evaluation system wherein a photograph of the human body is taken through an opaque grid screen adjacent to the body. That apparatus is the subject of a co-pending patent which can be consulted for an explanation of one use of the invention. As the posture evaluation would ordinarily be done in an examination room of a doctor's office, the unit is shown mounted in a ceiling 10 and has a housing 12 in which is received the below-described telescoping apparatus when it is retracted out of the way.

The housing 12 can be mounted in any convenient fashion, but as shown is centered between a pair of ceiling beams 14 and anchored by means of a pair of supports 16 which straddle these beams. A suitable cover plate 18 is applied principally for cosmetic purposes to the bottom of the housing 12.

Figure 2:
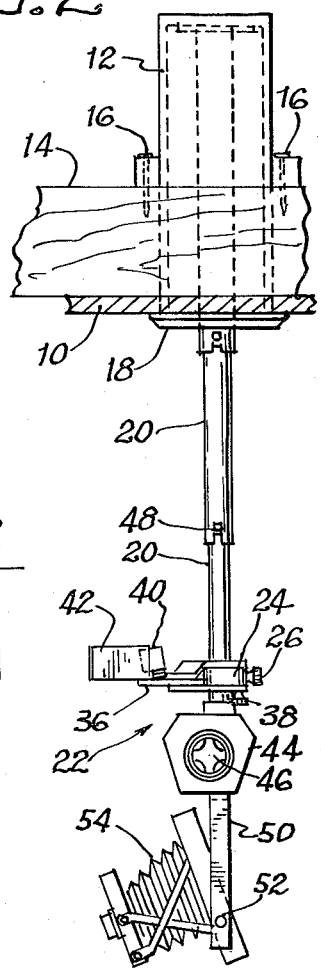
FIG. 2 is a side elevation view of the apparatus in FIG. 1 as seen from the right side.

Through the cover plate 18 extends several telescoping alluminum pipes or cylinders 20 which are almost fully received inside the housing 12 when not in use, and extend substantially beneath the housing as shown in FIGS. 1 and 2 when in use.

At the bottom of the lower-most of the cylinders 20 is a base portion of the unit 22, which serves as the mounting unit for the camera and lighting apparatus. Engaged on the base at the bottom end of the lower most cylinder is a collar unit 24 which is stablized against rotational play by means of a set knob 26.

This collar 24 has a pair of vertical bores on the respective sides thereof through which are extended frictionally tightenable bolts 28 which secure top and bottom struts 30 of the interior segments 32 of the light support arms, generally indicated by the numeral 34. It can be seen from the drawings that two pairs of these struts 30 define one pair of oppositely directed light supports. These inner segments 32 can each be easily adjusted by simply manual movement, which will effect their angular displacement in the horizontal plane provided the bolts 28 have not been tightened to the point of locking the arms in place.

Further adjustment of the support arms can be achieved by the angular adjustment of the outer segments 36 which are captured between the struts 30 at the outer ends thereof by means of the knobbed bolts 38. The left support arm shown from above in FIG. 3 shows the possible horizontal angular adjustments that can be achieved by moving the inner and outer arm segments at their respective pivot points.

Figure 3:
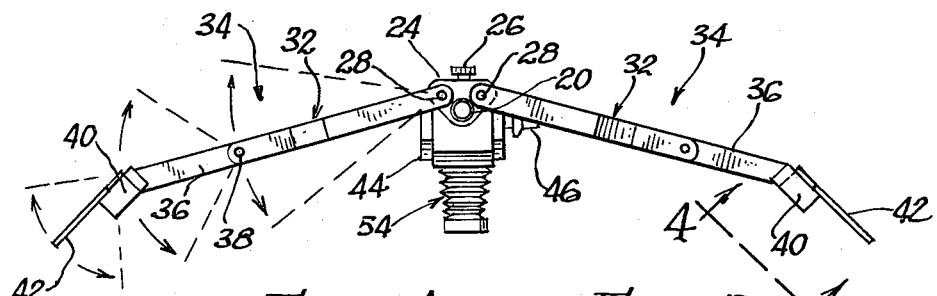
FIG. 3 is a sectional view taken along lines 3—3 of FIG. 1 looking down on the main body of the unit.

At the outer end of each of the light support arms 34 is mounted a directional strobescopic light 40 which as is best seen in FIG. 3 is angled about the vertical axis at about forty-five degrees forward, of the outer segments 36. Adjacent to and along the rear side of each of these lights is a diffusion screen 42, which may be mounted to the support arms 34 to the light itself, or both.

The angle of the light sources relative to the support arms is chosen at about forty-five degrees to permit the maximum separation of the two light sources to be achieved, i.e., when the support arms are essentially co-linear, when the optimum relative orientations between light sources, diffusion screens, and photographic subject are achieved.

Figure 4:
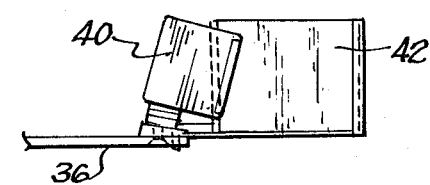
FIG. 4 is a detail elevation view of the unit as seen along lines 4—4 of FIG. 3.
Figure 5:
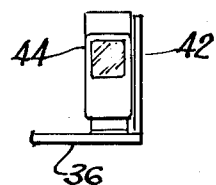
FIG. 5 is a side elevation view of the detail in FIG. 4 as seen from the right side.

The light sources could be directed downwardly somewhat as they are in the illustrated embodiment if it is intended that the camera level will also be somewhat downwardly directed to photograph a subject at a height somewhat less than the camera level. This downward angle can be seen best in FIG. 4, and is of course, subject to variation in accordance with the vertical height difference between subject and light.

Turning now to the structure beneath the light support arms 34, the lower most of the cylinders 20 extend through the support arm collar 24 and into a counter balance adjustment housing 44. This housing contains a coiled leaf-type spring of the general type typical in wrist watches and clocks which provide almost even resistance to rotation over a fairly wide angular displacement. This spring is connected to a cable which extends up through the cylinders 20 and is unyieldingly mounted to a fixed member within the housing 12.

The knob 46 communicates to this spring by means of an interior spindle upon which the spring is wound so that in rather conventional fashion turning the knob 36 will increase or decrease the tension on the spring. When the proper tension is achieved, the camera and light bar assembly will be virtually weightless and can be set at any height within the range limits on the cylinders 20, and they will remain in that position.

The above-mentioned leaf spring and cable disposed within the cylinders, together with the spring housing 44 and the knob 46 have not been exploded and shown in detail because this structure is standard to a lighting system known as the ANTI-G LIGHT HANGER. This system also provides each of the cylinders 20 with a key 48 which rides in a channel in the next adjacent cylinder to prevent rotation of any of the cylinders about the vertical axis relative to the others of the cylinders.

At the bottom of the cable spring housing 44 is attached an angle bracket 50, the depending portion of which is provided with a hole through which bolt 52 engages a camera 54 in the threaded bore used to engage the camera on a tripod. Other parts of the camera are the timer 56 and the viewer 58, and interconnecting wires 60 which are used to fire the camera and the strobe light simultaneously. It should be noted also that the angle bracket 50 could naturally be provided with other bores and structure for attaching different types of cameras, so that it becomes a virtually universal camera mount.

As described and claimed herein, the invention provides an easy to use, retractable camera and lighting unit that can be maintained adjacent to the ceiling of a room when not in use, and simply pulled down into camera-ready position for use. The strobe lights are simply positioned to accommodate the shadow-casting characteristics of a particular subject, and a non-distorted, accurate photograph is simply taken by triggering both lights and camera simultaneously.

The screens may be made of any suitable material having a diffusing surface. An ideal screen has been produced from a white plastic panel having one surface sanded to provide a diffusion surface, and that surface being sprayed beige. It has been found that a white screen produces too much glare, and toning the surface down with beige produces a softer, more even lighting on the subject.

Variations of the exact nature of the support arms, lights and diffusion screen are intended to fall within the scope of the appended claims.

I claim:

1. A photographic accessory assembly for illuminating an area to be photographed, said accessory comprising:
   (a) a mounting means;
   (b) a directional high intensity light source mounted on said mounting means and directed substantially away from said area to be photographed;
   (c) a reflective light diffusion screen mounted adjacent said high intensity light source and angled to reflect diffused light from said source onto said area to be photographed.

2. Structure according to claim 1 wherein said mounting means includes a base having an arm extended therefrom, said arm having an outer segment and an inner segment, the latter being pivoted, to move in the horizontal plane, to said base at the inner end thereof and to said outer segment at the outer end thereof, said source and said screen being mounted on the end of said outer segment.

3. Structure according to claim 2 and including a second arm extending from said base and having a directional high intensity light source and diffusion screen mounted to the end thereof, said second arm extending substantially in the opposite direction from the first-mentioned arm.

4. Structure according to claim 3 and including a camera mounted to said base and disposed substantially between said two light sources.

5. Structure according to claim 1 wherein said mounting means includes a counter-balanced height-adjustable extension to connect said base to a room ceiling to permit simple vertical adjustment of said camera and light source.

6. Structure according to claim 3 wherein said directional light sources are directed at an angle forty-five degrees forward of the direction of extension of said arms.

* * * * *